US005582326A

United States Patent [19]

Nishimura

[11] Patent Number: 5,582,326

[45] Date of Patent: Dec. 10, 1996

[54] DRINKING-WATER SERVICE SYSTEM FOR ATHLETES

[76] Inventor: Takashi Nishimura, 701, 1-23-18, Arima, Miyamae-ku, Kawasaki-shi, Kanagawa-ken, Japan

[21] Appl. No.: 444,412

[22] Filed: May 19, 1995

[51] Int. Cl.[6] .......... B65G 59/00

[52] U.S. Cl. .......... 221/281; 221/307; 221/310; 221/311; 221/312 R; 312/45

[58] Field of Search .......... 312/45, 49, 72; 221/191, 193, 194, 281, 303, 307, 309, 310, 311, 312 R, 172, 173, 171

[56] References Cited

U.S. PATENT DOCUMENTS

| | | | |
|---|---|---|---|
| 1,618,178 | 2/1927 | Erdoes | 312/45 |
| 1,869,944 | 8/1932 | Raney | 312/45 |
| 1,930,321 | 10/1933 | Ogden | 312/45 |
| 3,206,067 | 9/1965 | Smith et al. | 221/309 |
| 3,782,517 | 1/1974 | Newcomb | 221/172 |
| 4,046,284 | 9/1977 | Sattyelsson | 221/281 |
| 4,398,716 | 8/1983 | Argibay et al. | 221/310 |

FOREIGN PATENT DOCUMENTS

| | | | |
|---|---|---|---|
| 406012564 | 1/1994 | Japan | 221/172 |
| 94023619 | 10/1994 | WIPO | 221/194 |

*Primary Examiner*—H. Grant Skaggs

*Attorney, Agent, or Firm*—Emmanuel J. Lobato; Burns & Lobato, P.C.

[57] ABSTRACT

A drinking-water service system for supplying individual cylindrical containers of drinking water to athletes. A storage and dispensing unit for storing the containers for semi-automatically sequentially dispensing individually the drinking water containers to athletes. A multi-stage storage and delivery control passageway has a rolling section generally inclined downwardly for receiving and storing the containers disposed side by side and gravity biased. An uprighting section receives the containers from the rolling section successively and its surfaces cause the containers to assume an upright position for travel downwardly to a dispensing section which has a dispensing outlet opening through which the containers are dispensed to a horizontal stand surface. Flexible retainers at the opening effectively retain an upper part of the individual cans dispensed so that the next successive container is retained in the dispensing section and the containers can be manually grasped below the retainers and removed from the stand surface. When a container is removed a next successive container is dispensed from the dispensing section through the opening on to the stand surface under the control of gravity.

5 Claims, 5 Drawing Sheets

DRINKING-WATER SERVICE SYSTEM FOR ATHLETES

BACKGROUND OF THE INVENTION

I. Field of the Invention

The present invention relates to a drinking-water service system for supplying drinking water to athletes participating in athletic events such as running in marathons or participating in bicycle races and the like.

II. Description of the Prior Art

The supply of drinking water to athletes participating in athletic events has hitherto been carried out by arranging tables at predetermined points along a course in which an athletic competition event is taking place and placing several drinking water containers, such as glasses or bottles, on the tables so as to be taken by the athletes. These tables generally have placed thereon a substantial number of such containers. The tables are approached by a number of athletes, and it becomes difficult for the athletes to approach the distribution tables since they approach at high speeds and seek to grasp one of the containers and continue on their course. The result is that accidents often occur at such drinking-water distribution points. The athletes collide and sometimes fall down and are not only delayed but may be sufficiently physically hampered that they reduce their running speeds.

Furthermore, the necessity for coping with drinking-water distribution points requires the athletes to approach the water service tables at reduced speeds and often the athletes are unable to grasp a container in view of the congestion at the service or distribution points.

SUMMARY OF THE INVENTION

It is an object of the present invention to provide a novel drinking-water service system for athletic events and participating athletes and which solves the problems involved in the prior art or methods of drinking-water service points for such events.

It is a principal object of the present invention to provide a drinking-water service system for storing a multiplicity of drinking-water containers which are dispensed one-by-one to individual athletes.

A feature of the present invention is the provision of a portable storage and dispensing unit for drinking-water containers. A plurality of the containers are stored at the service point. The containers themselves have a cylindrical shape capable of being readily grasped manually by the individual athletes.

The drinking-water service system for supplying water to the individual athletes is a storage and dispensing unit having a storage space for receiving and storing a plurality of cylindrical drinking-water containers for semi-automatically sequentially dispensing individually the cylindrical drinking-water containers to individual athletes. The storage space is constructed as a multi-stage storage and deliverying control passageway having an inlet opening and a plurality of sequential contiguous sections downstream of the inlet opening, including a rolling section generally inclined downwardly for receiving and storing a large number of the cylindrical drinking-water containers disposed in a side-by-side sequence, each extending longitudinally in a horizontal position. Since the drinking-water containers are cylindrical, they are gravity-biased and capable of rolling along an inclined path defined by the rolling section of the passageway. They are delivered individually in sequence by rolling to an uprighting section of the passageway which has a downwardly inclined sidewall which widens the passageway and which cooperates with the containers individually to allow a bottom end thereof to fall freely and move downwardly in the widened portion of the passageway with an opposite or upper end temporarily restrained so that the individual cylindrical water containers assume an upright position somewhat inclined from the vertical. In this position they enter a dispensing section of the passageway and are guided downwardly upright vertically therein. The dispensing section has a terminal outlet opening through which the containers are dispensed individually in an upright position onto a horizontal stand surface below the dispensing outlet opening and spaced therefrom a distance greater than a length of a cylindrical drinking-water container but less than the length of two such containers in tandem. This distance or spacing allows dispensing of one container at a time to be dispensed upright onto the stand surface and support and retain within the dispensing section a next successive drinking-water container extending partially outwardly of the dispensing outlet opening. The control passageway is provided at the outlet opening with a plurality of depending flexible retainers, which are disposed circumferentially of the outlet that opening and, although flexible, are sufficiently rigid to maintain the individually dispensed containers stable and upright on the stand horizontal surface onto which they are dispensed so that the individual containers delivered sequentially are vertically upright in position to be manually grasped by the individual athletes. In this manner the drinking-water containers are semiautomatically dispensed individually in sequence under control of gravity and without crowding at the service point by congestions of athletes.

BRIEF DESCRIPTION OF THE DRAWINGS

These and other objects, advantages and features of the drinking-water system for athletes according to the present invention will become apparent upon reference to the following description when read in light of the attached drawings wherein like elements are referenced by like numerals, and in which.

DESCRIPTION OF THE PREFERRED EMBODIMENTS

Figure 1:
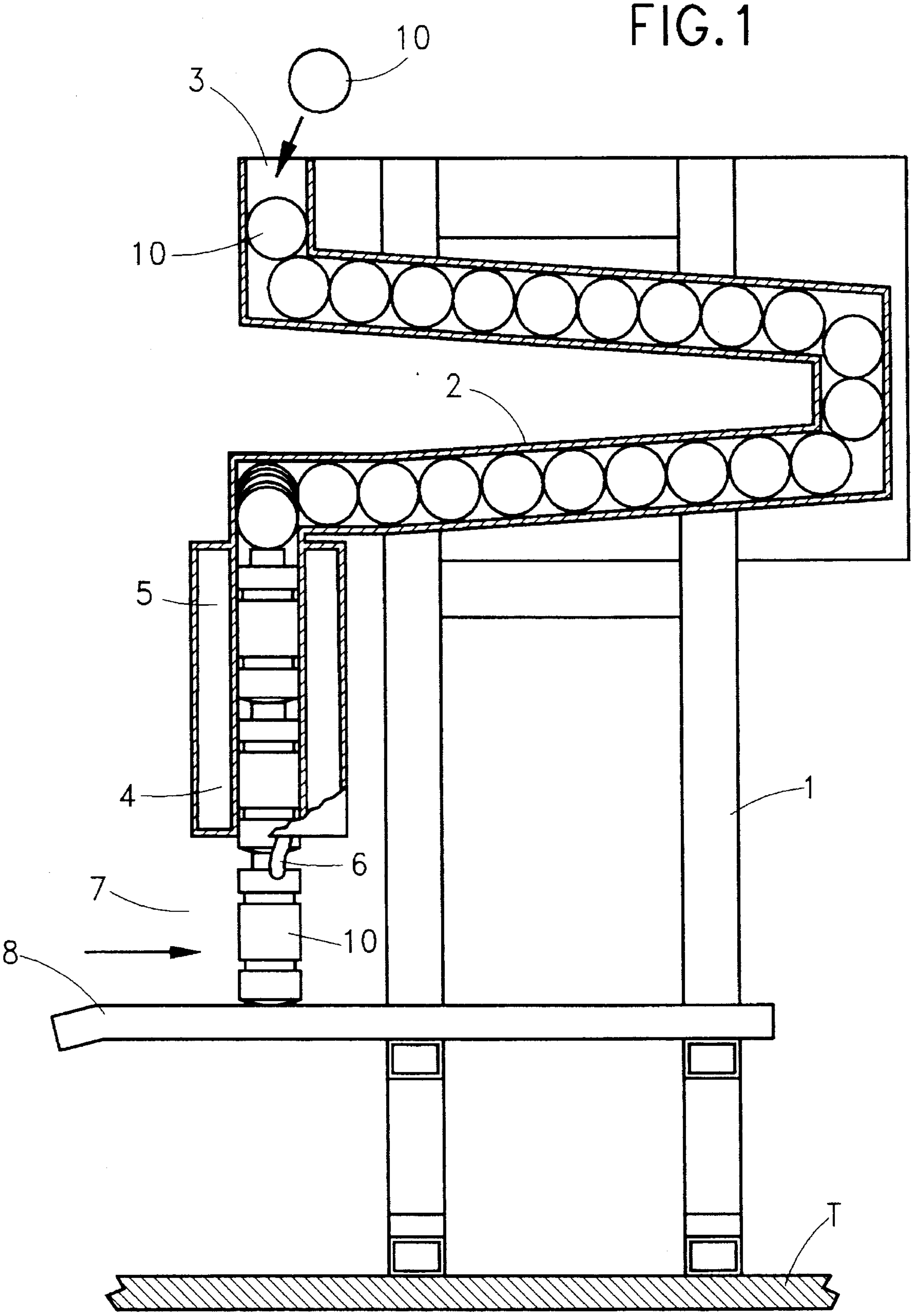
FIG. 1 is a partially cut-away front elevation view of a drinking-water service system according to the invention.

Exemplary embodiments of the present invention are described herein with reference to the accompanying drawings. FIG. 1 illustrates the novel drinking-water service system for supplying individual drinking-water containers to athletes during an athletic event. As shown in the drawing, a portable storage and dispensing unit 1 embodies the service system for storing a plurality of individual drinking-water containers 10 for semi-automatically sequentially dispensing thereof individually to athletes. The unit 1 is illustrated mounted on a tape top at a flat place on an athletic event course. The table, shown diagrammatically as the top thereof, is of suitable height. The unit has a storage space multi-stage storage and delivery control passageway and has a rolling section 2, provided with a loading opening 3. The passageway section 2 has a zigzag configuration defining a downwardly directed path. The containers are loaded into the passageway individually so that they are disposed in a side-by-side sequence, each extending longitudinally in a horizontal position. Since the containers are cylindrical, they are gravity-biased to roll on the inclined path defined by the rolling section 2 of the passageway. The zig-zag configuration at different levels provides for increased length of the path and accordingly an increased storage capacity of the number of containers that can be stored therein.

Figure 2:
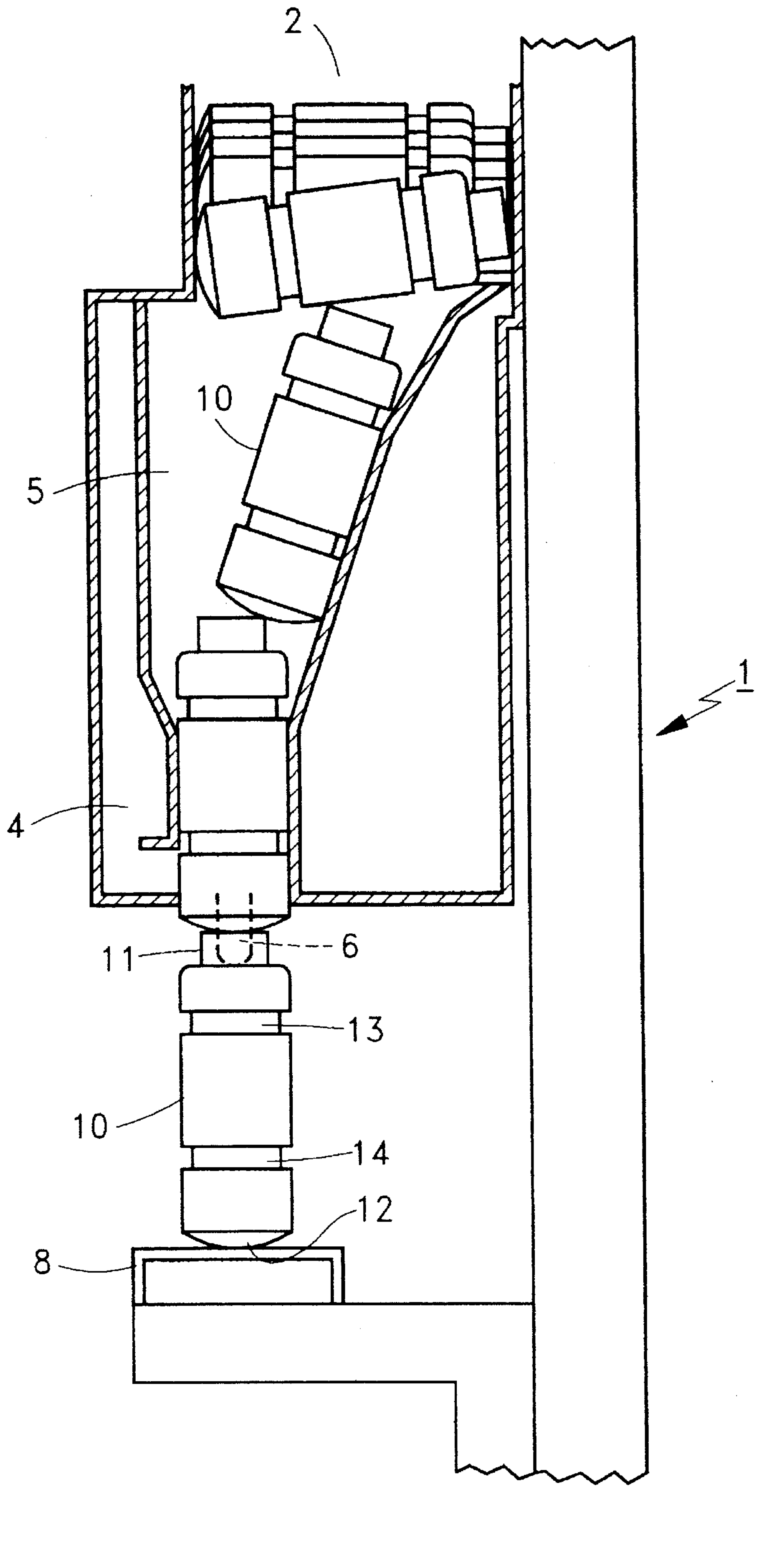
FIG. 2 is a fragmentary and partially cut-away side elevation view of the drinking-water service system of FIG. 1.

The control passageway sections include a next successive section 5 which receives the rolling cans from the rolling section 2 disposed horizontally, and, as illustrated in FIG. 2, the section 5 has a inclined side wall and increased width dimension so that a bottom end of the individual containers is allowed to fall downwardly while the upper end is retained so that the individual containers are allowed to assume a substantially upright position somewhat inclined from the vertical and move downwardly under their own weight into a vertical dispensing section 4 of the passageway in which the containers move downwardly in a vertical position for being dispensed therefrom.

The dispensing section 4 is provided with a terminal outlet opening through which the containers are dispensed sequentially. The outlet opening has disposed circumferentially thereof a plurality of circumferentially spaced retainers 6 which are flexible and depend downwardly from the outlet opening of the dispensing section 4.

The dispensed containers 10 fall longitudinally through a space 7 onto a horizontal surface of a stand 8 on which the individual containers 10 come to rest upon being dispensed. The space or distance 7 between the dispensing section 4 opening outlet and the stand surface 8 is selected such that the distance is greater than the length of a cylindrical drinking-water container 10 but less than the length of two drinking-water containers 10 disposed in tandem. Thus, as illustrated in FIG. 2, a dispensed container 10 is received on the horizontal surface of the stand 8 below the dispensing section 4 and is free of the passageway.

The flexible retainer 6 extending or depending downwardly are circumferentially spaced and of sufficient rigidity to maintain the individual dispensed containers 10 upright and stable as they are dispensed so that a dispensed container holds a next successive drinking-water container disposed within the dispensing section 4, as illustrated in FIG. 2, extending somewhat upwardly of the dispensing section in readiness for delivery once the lowermost dispensed container is removed from the stand 8.

Figure 3:
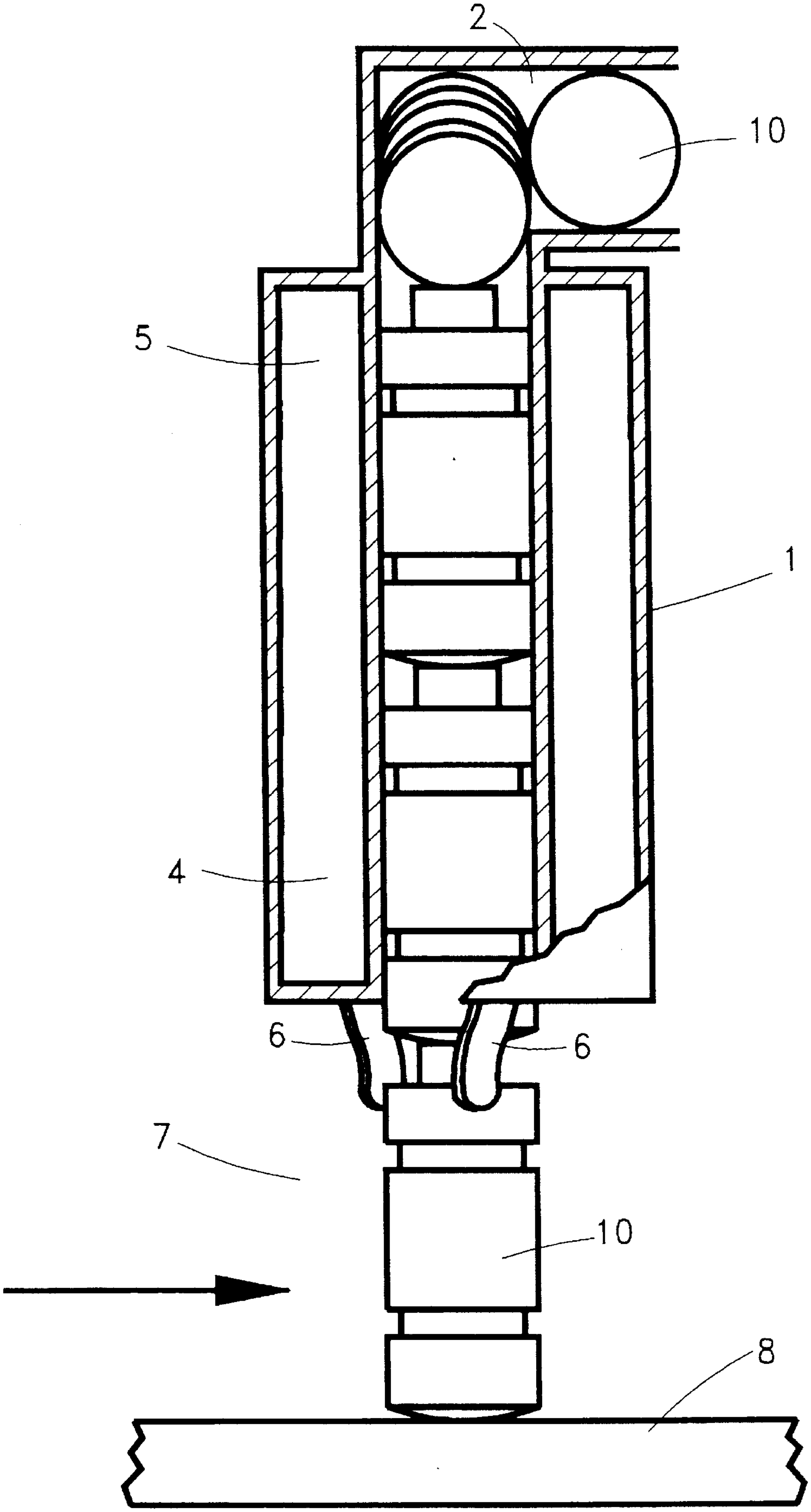
FIG. 3 is a fragmentary and partially cut-away enlarged front elevation view of a part of the drinking-water service system shown in FIG. 1, illustrating the dispensing of a drinking-water container therefrom.
Figure 4:
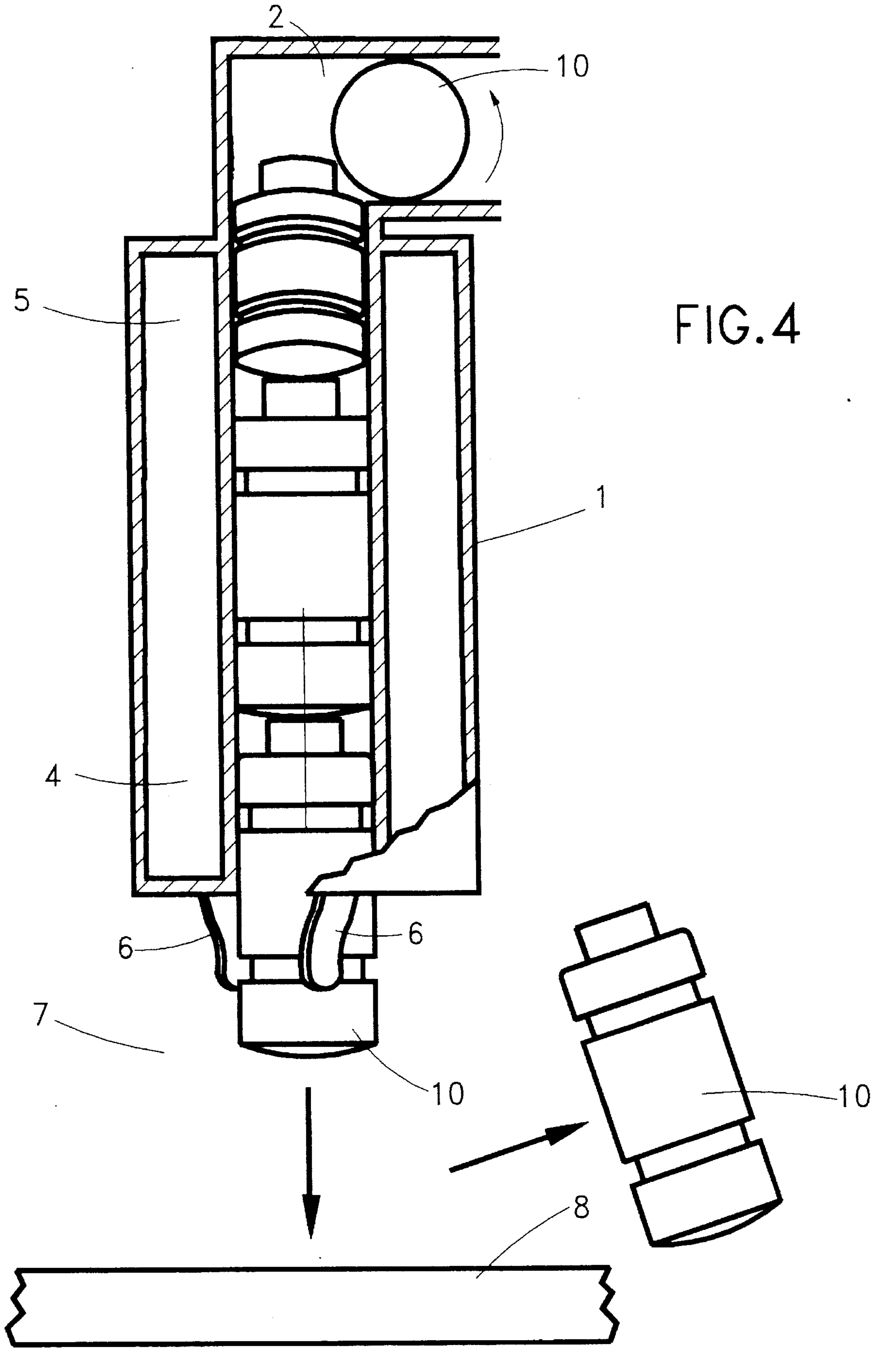
FIG. 4 is a fragmentary and partially cut-away enlarged front elevation view of a part of the drinking-water supply system shown in FIG. 3, illustrating this system upon manual removal of a dispensed drinking-water container therefrom.

The retaining elements 11 have a flexibility that allows the individually dispensed drinking-water containers to be grasped manually and removed from the stand in the direction of the arrows shown in FIGS. 1, 3 and clearly illustrated in FIG. 4. As can be seen in FIG. 4, once a dispensed container is removed manually to the right from the stand 8, the next successive container is dispensed downwardly, as shown by the downwardly directed arrow, and the dispensed container comes to rest on the stand horizontal surface in readiness to be removed manually while retaining a next successive drinking-water container within the dispensing section 4 vertically positioned upright.

The individual drinking-water containers 10 have an upper end lid 11 and a spherically convex bottom 12 so that they can be readily removed manually from the stand 8 sequentially and thereby dispensed one-by-one.

Figure 5:
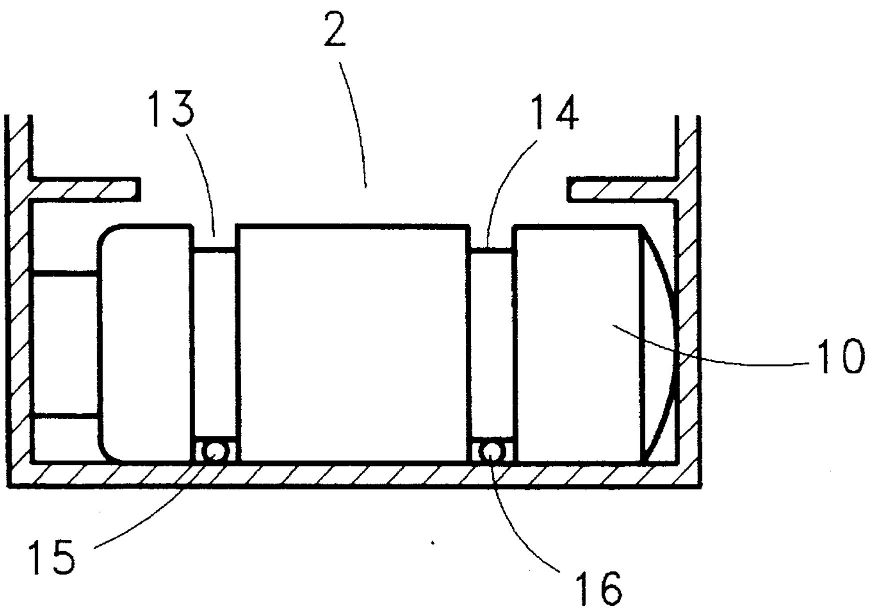
FIG. 5 is a cross-sectional view of a storage and rolling section of a multi-stage storage and delivery control passageway of the system shown in FIG. 1.

Since the drinking-water containers are cylindrical, they roll readily within the section 2 of the storage and delivery control passageway 2. The cans are provided with at least one and preferably two circumferential grooves 13, 14 in which are received parallel guide rails 15, 16 disposed on a lower surface of the rolling section 2, as illustrated in FIG. 5. The guide rails maintain the rolling cylindrical drinking-water containers aligned within the rolling section 2, precluding any jamming therein. The provision of the two circumferential grooves 13, 14 also provides an easily grasped surface therebetween for manual removal of the individual drinking-water containers from the stand 8. The cooperating grooves and guide rails ensure the retaining of the containers 10 in a horizontal position for ease of rolling. Instead of circumferential grooves, the cylindrical containers can be provided with cylindrical circumferential collars received in grooves, not shown, formed on the bottom of the rolling passageway section 2 so that the roll guidance is similar to that described above. The drinking-water service system thus provides a portable unit in which a plurality of cylindrical drinking-water containers can be easily loaded and dispensed.

Those skilled in the art will readily appreciate that since the drinking-water containers are set in position one-by-one instead of being juxtapositioned in a plurality of containers alongside each other on a table, as is the usual case, it is very easy for the athletes to grasp the containers individually and remove them from the stand so that they easily depart from the service area, avoiding contact with each other and any possible accidents. The athletes participating in athletic events do not have to greatly reduce their speeds and can readily run by, for example, the dispensing unit and take their individual drinking-water containers and depart.

The athletes are relieved from any psychological burden as to selection of the containers juxtapositioned in the usual manner. The stand-by time for taking a drinking-water container is minimized. Furthermore, since the dispensing is accomplished under the control of gravity, and without power-driven mechanisms, there is no fear of any unexpected machinery failures. Furthermore, the portable dispensing unit 1 can be positioned anywhere along an athletic course without need of access to a power source.

Figure 6:
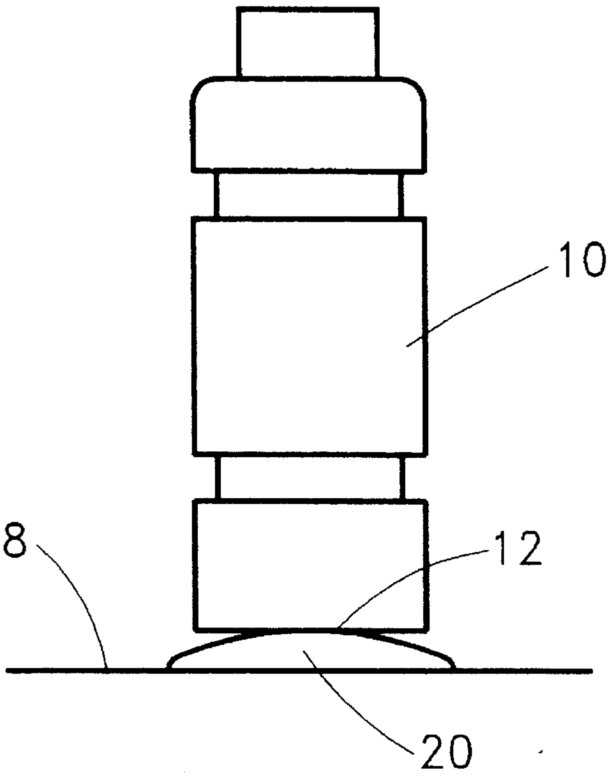
FIG. 6 is a fragmentary elevation view of another embodiment of the drinking-water service system shown in FIG. 1.

A second embodiment of the storage and dispensing unit is fragmentarily illustrated in FIG. 6, in which a stand 8 is constructed with a flat horizontal surface having a spherical convex surface 20 in position in which the dispensed drinking-water containers are received. In this case, the bottom 12 of the individual cylindrical containers is constructed flat. The cooperating flat and convex surface allow for ease of removal of an individual drinking-water container from the stand.

While illustrative and preferred embodiments of the present invention have been shown and described, it is to be understood that the inventive concepts of the service system disclosed and embodied may be embodied and employed variously without departing from the spirit and scope of the present invention. The appended claims are intended to be construed to include such variations except insofar as limited by prior art.

What I claim is:

1. A drinking-water service system for supplying individual cylindrical containers of drinking water to athletes comprising:

a storage and dispensing unit for storing a plurality of cylindrical drinking-water containers having a bottom and a top end and dispensing therefrom individually said cylindrical drinking-water containers to athletes participating in athletic events;

said unit having a storage space for receiving and storing a plurality of said cylindrical drinking-water containers for semi-automatically sequentially dispensing individually the cylindrical drinking-water containers to athletes;

means defining in said storage space a multi-stage storage and delivery control passageway having an inlet opening and a plurality of sequential contiguous sections downstream thereof including a rolling section generally inclined downwardly for receiving and storing a plurality of the cylindrical drinking-water containers disposed in a side-by-side sequence each extending longitudinally in a horizontal position and gravity-biased to roll along any inclined path defined by said rolling section of said passageway, an uprighting section of said multi-stage passageway receiving individual cylindrical drinking-water containers from said rolling section and having surfaces effectively causing each horizontal longitudinally extending cylindrical drinking-water container received successively to assume a substantially upright position for travel downwardly in said uprighting section with said bottom thereof lower than said top end, a dispensing section in said passageway receptive of individual cylindrical drinking-water containers sucessively from said uprighting section and having internal surfaces guiding downward travel in an upright position the individual cylindrical drinking-water containers received, said dispensing section having a lower dispensing outlet opening of said passageway through which said cylindrical drinking-water containers are semi-automatically dispensed from said passageway under control of gravity;

a horizontal stand surface spaced downwardly from the dispensing outlet opening for individual cylindrical drinking-water containers to descend free of said passageway onto said stand surface in an upright position and maintain a next successive cylindrical drinking-water container extending downwardly partially outwardly of said passageway through said outlet opening;

a plurality of flexible retainers extending downwardly of said outlet opening circumferentially spaced relative thereto for effectively retaining circumferentially an upper part of individual successively dispensed cylindrical drinking-water containers aligned with said outlet opening and said individually dispensed cylindrical water containers retaining a next sucessive cylindrical drinking-water container in said dispensing section extending downwardly partially outwardly of said outlet opening; and said flexible retainers terminating spaced above said stand and a lower part of the individual cylindrical drinking-water containers dispensed onto said stand surface so that the individual cylindrical drinking-water containers can be manually grasped below the retainers and removed from the stand surface and the next cylindrical drinking-water container dispensed onto the stand surface under control of gravity.

2. A water supply system according to claim 1, in which said cylindrical drinking-water containers have a groove circumferentially thereof and said rolling section comprises a guide rail received in said groove for guiding the individual cylindrical drinking-water containers during the rolling thereof in said rolling section.

3. A water supply system according to claim 1, in which said rolling section zigzags in opposite directions for effectively increasing the length of said rolling section to thereby increase storage capacity of the number of cylindrical drinking-water containers stored therein.

4. A water supply system according to claim 1, in which said stand surface is a flat surface, and in which each cylindrical drinking-water container has a spherical convex bottom.

5. A water supply system according to claim 1, in which said stand surface is convex in cross section, and said cylindrical drinking-water containers have a flat bottom.

* * * * *